United States Patent
Levoy et al.

(10) Patent No.: US 8,003,557 B2
(45) Date of Patent: Aug. 23, 2011

(54) VOLUME-CHANGE RESISTANT SILICON OXY-NITRIDE OR SILICON OXY-NITRIDE AND SILICON NITRIDE BONDED SILICON CARBIDE REFRACTORY

(75) Inventors: Nancy P. Levoy, Acton, MA (US); Edmund A. Cortellini, North Brookfield, MA (US); Eric Jorge, Les Valayans (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 98 days.

(21) Appl. No.: 12/483,788

(22) Filed: Jun. 12, 2009

(65) Prior Publication Data
US 2009/0312173 A1 Dec. 17, 2009

Related U.S. Application Data

(60) Provisional application No. 61/131,945, filed on Jun. 13, 2008.

(51) Int. Cl.
*C04B 35/567* (2006.01)
*C04B 35/597* (2006.01)

(52) U.S. Cl. ............... 501/92; 501/91; 501/96.1

(58) Field of Classification Search ............ 501/92, 501/96.1, 91
See application file for complete search history.

(56) References Cited

U.S. PATENT DOCUMENTS

| | | | |
|---|---|---|---|
| 728,306 A | 5/1903 | Schatz | |
| 2,752,258 A | 6/1956 | Swentzel | |
| 3,960,577 A | 6/1976 | Prochazka | |
| 4,476,234 A * | 10/1984 | Jones et al. | 501/89 |
| 4,956,317 A | 9/1990 | Yokoi et al. | |
| 5,028,346 A | 7/1991 | Dulin | |
| 5,068,154 A | 11/1991 | Mignani et al. | |
| 5,132,257 A | 7/1992 | Kodama et al. | |
| 5,135,893 A | 8/1992 | Dohi et al. | |
| 5,162,270 A | 11/1992 | Ownby et al. | |
| 5,212,123 A * | 5/1993 | Schoennahl | 501/87 |
| 5,459,112 A | 10/1995 | Kim | |
| 5,837,631 A | 11/1998 | Elstner et al. | |
| 5,962,103 A | 10/1999 | Luthra et al. | |
| 6,893,992 B2 | 5/2005 | Doza et al. | |

(Continued)

FOREIGN PATENT DOCUMENTS

EP    0 742 187 A2    11/1996

(Continued)

OTHER PUBLICATIONS

Ohtsuka, S., et al., "Effect of Oxygen Segregation at Grain Boundaries on Deformation of B, C-Doped Silicon Carbides at Elevated Temperatures," *J. Am. Ceram. Soc.*, 88(6):1558-1563 (2005).

(Continued)

*Primary Examiner* — Karl E Group
(74) *Attorney, Agent, or Firm* — Hamilton, Brook, Smith & Reynolds, P.C.

(57) ABSTRACT

A reaction sintered silicon carbide-based product, including a silicon carbide component, a bond component, wherein the bond component includes silicon oxynitride in excess of any silicon nitride of the bond component, and at least one boron component residual to an amount present prior to reaction sintering to cause increased resistance of the reaction sintered silicon carbide-based product to volume change under oxidative stress, and methods of making the same.

10 Claims, 2 Drawing Sheets

U.S. PATENT DOCUMENTS

| | | |
|---|---|---|
| 2002/0016248 A1 | 2/2002 | Ohji et al. |
| 2002/0155940 A1 | 10/2002 | Kobayashi |
| 2004/0053769 A1 | 3/2004 | Wötting et al. |
| 2005/0020431 A1 | 1/2005 | Tani |
| 2005/0084717 A1 | 4/2005 | Tani et al. |
| 2007/0264576 A1 | 11/2007 | Jorge et al. |
| 2008/0234122 A1* | 9/2008 | Jorge et al. ............. 501/92 |

FOREIGN PATENT DOCUMENTS

| | | |
|---|---|---|
| GB | 728306 | 4/1955 |
| JP | 11130538 A | 5/1989 |
| JP | 01-294582 A | 11/1989 |
| JP | 3115174 A | 5/1991 |
| JP | 4280870 A | 10/1992 |
| JP | 4325461 A | 11/1992 |
| JP | 7187831 A | 7/1995 |
| JP | 8231278 A | 9/1996 |
| JP | 11335169 A | 12/1999 |
| JP | 2000169231 A | 6/2000 |
| WO | WO 00/32537 A | 6/2000 |
| WO | WO 2006/056698 A2 | 6/2006 |

OTHER PUBLICATIONS

Magnani, G., and Beaulardi, L., "Properties of Liquid Phase Pressureless Sintered SiC-Based Materials Obtained Without Powder Bed," *Aust. Ceram. Soc.*, 41(1):8-16 (2005).

Kim, Y.W, et al., "High-Temperature Strength of Liquid-Phase-Sintered SiC Ceramics with Oxynitride Glass," *Key Engineering Materials*, 247:267-270 (2003).

Rixecker, G., et al., "Fracture Properties of SiC Ceramics with Oxynitride Additives," *Journal of the European Ceramic Society*, 22:2669-2675 (2002).

Zhou, Y., et al., "Tailoring the Mechanical Properties of Silicon Carbide Ceramics by Modification of the Intergranular Phase Chemistry and Microstructure," *Journal of the European Ceramic Society*, 22:2689-2696 (2002).

Jang, C.W., et al., "Effect of Sintering Atmosphere on Grain Shape and Grain Growth in Liquid-Phase-Sintered Silicon Carbide," *J. Am. Ceram. Soc.*, 85(5):1281-1284 (2002).

Nagano, T., et al., "Superplastic Behavior of Liquid-Phase Sintered $\beta$-SiC Prepared with Oxynitride Glasses in an $N_2$ Atmosphere," *Journal of the European Ceramic Society*, 22:263-270 (2002).

Sixta, M.E., et al., "Flexural Creep of an in Situ-Toughened Silicon Carbide," *J. Am. Ceram. Soc.*, 84(9):2022-2028 (2001).

Zhang, X.F., et al., "Secondary Phases in Hot-Pressed Aluminum-Boron-Carbon-Silicon Carbide," *J. Am. Ceram. Soc.*, 84(4):813-820 (2001).

Chen, D., et al., "Role of the Grain-Boundary Phase on the Elevated-Temperature Strength, Toughness, Fatigue and Creep Resistance of Silicon Carbide Sintered with Al, B and C," *Acta Mater*, 48:4599-4608 (2000).

Zhou, Y., et al., "Silicon Carbide Ceramics Prepared by Pulse Electric Current Sintering of $\beta$-SiC and $\alpha$-SiC Powders with Oxide and Nonoxide Additives," *J. Mater. Res.*, 14(8):3363-3369 (1999).

Edwards, D.P., et al., "The Development of Microstructure in Silicon Nitride-Bonded Silicon Carbide," *Journal of the European Ceramic Society*, 15:415-424 (1995).

PCT/US2009/047206: Notification of Transmittal of the International Search Report and the Written Opinion of the International Searching Authority, or the Declaration dated Sep. 4, 2009.

PCT/US2009/047206: International Search Report dated Sep. 4, 2009.

PCT/US2009/047206: Written Opinion of the International Searching Authority dated Sep. 4, 2009.

* cited by examiner

VOLUME-CHANGE RESISTANT SILICON OXY-NITRIDE OR SILICON OXY-NITRIDE AND SILICON NITRIDE BONDED SILICON CARBIDE REFRACTORY

RELATED APPLICATIONS

This application claims the benefit of U.S. Provisional Application No. 61/131,945, filed on Jun. 13, 2008. The entire teachings of the above application are incorporated herein by reference.

BACKGROUND OF THE INVENTION

Silicon carbide is well known for its high strength, hardness, and its resistance to oxidation, corrosion, and abrasion. Consequently, silicon carbide and reaction-bonded silicon carbide are employed in many applications requiring these properties. Reaction-bonded silicon carbide includes a discontinuous silicon carbide grain phase held together within a continuous bond phase matrix.

For example, blocks based on silicon carbide (SiC), bound by a matrix of silicon nitride ($Si_3N_4$) are known. The materials for such blocks are described, for example, in U.S. Pat. No. 2,752,258. They improve the compromise between oxidation resistance, mechanical strength (erosion), and thermal conductivity relative to carbon blocks. Such blocks are obtained by reaction sintering of a mixture of silicon carbide and silicon, with nitrogen deriving from firing in a nitrogen atmosphere.

A heterogeneous nitridation reaction also can be employed to yield bond phases other than silicon nitride. For example, reaction-bonded silicon carbide, in which the major component of the bond phase is silicon oxynitride, ($Si_2ON_2$), can be produced by nitriding a mixture including particulate silicon carbide, silicon metal powder, and an oxygen source.

However, typically silicon oxynitride bonded silicon carbide will exhibit increases in volume change upon extended exposure to oxidative stress, and so can be unsuitable for certain applications, such as use as tiles in some types of incinerators.

A need therefore exists for a silicon oxynitride bonded silicon carbide refractory material that significantly reduces or eliminates the above-referenced problems.

SUMMARY OF THE INVENTION

The present invention generally is directed to a reaction sintered silicon carbide-based product that includes boron and is resistant to volume changes in response to oxidative stress.

In one aspect, the present invention relates to a reaction sintered silicon carbide-based product including a silicon carbide component, a bond component, wherein the bond component includes silicon oxynitride in excess of any silicon nitride of the bond component, and at least one boron component residual to an amount present prior to reaction sintering to cause increased resistance of the reaction sintered silicon carbide-based product to volume change under oxidative stress.

In another aspect, the present invention relates to a method of forming a silicon oxynitride bonded silicon carbide-based product, including the steps of preparing a charge having a mixture containing silicon carbide, silicon metal, silica, limestone, a binder, and at least one boron compound in an amount to cause increased resistance of the silicon oxynitride bonded silicon carbide-based product to volume change under oxidative stress, forming the charge into a preform, and firing the preform in a nitrogen atmosphere to form the silicon oxynitride bonded silicon carbide-based product.

In another aspect, the present invention relates to a method of forming a silicon oxynitride bonded silicon carbide-based product, including the steps of preparing a charge having a mixture containing silicon carbide, silicon metal, limestone, a binder, and at least one boron compound in an amount to cause increased resistance of the silicon oxynitride bonded silicon carbide-based product to volume change under oxidative stress, forming the charge into a preform, and firing the preform in a mixed atmosphere of oxygen and nitrogen to form the silicon oxynitride bonded silicon carbide-based product.

In another aspect, the present invention relates to a silicon oxynitride bonded silicon carbide-based product, formed by a method including the steps of preparing a charge having a mixture containing silicon carbide, silicon metal, silica, limestone, a binder, and at least one boron compound in an amount to cause increased resistance of the silicon oxynitride bonded silicon carbide-based product to volume change under oxidative stress, forming the charge into a preform, and firing the preform in a nitrogen atmosphere to form the silicon oxynitride bonded silicon carbide-based product.

In another aspect, the present invention relates to a silicon oxynitride bonded silicon carbide-based product, formed by a method including the steps of preparing a charge having a mixture containing silicon carbide, silicon metal, a binder, and at least one of a boron compound in an amount to cause increased resistance of the silicon oxynitride bonded silicon carbide-based product to volume change under oxidative stress, forming the charge into a preform, and firing the preform in a mixed atmosphere of oxygen and nitrogen to form the silicon oxynitride bonded silicon carbide-based product.

In another aspect, the present invention relates to a charge for a refractory article, having silicon carbide, at least one boron compound, silicon metal, silica, and a binder.

In another aspect, the present invention relates to an oxynitride bonded silicon carbide refractory material having improved resistance to volume change under oxidative stress, wherein the improvement includes at least one boron component residual to an amount present prior to reaction sintering to cause increased resistance of the reaction sintered silicon carbide-based product to volume change under oxidative stress.

The silicon oxynitride bonded silicon carbide or silicon oxynitride and silicon nitride bonded silicon carbide of the invention has improved resistance to volume increase under oxidative stress. Further, another advantage is that a sealed surface coating is not necessary to protect against oxidation, because the boron is present throughout the article. As a result, a cracked or worn surface would not be a concern.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
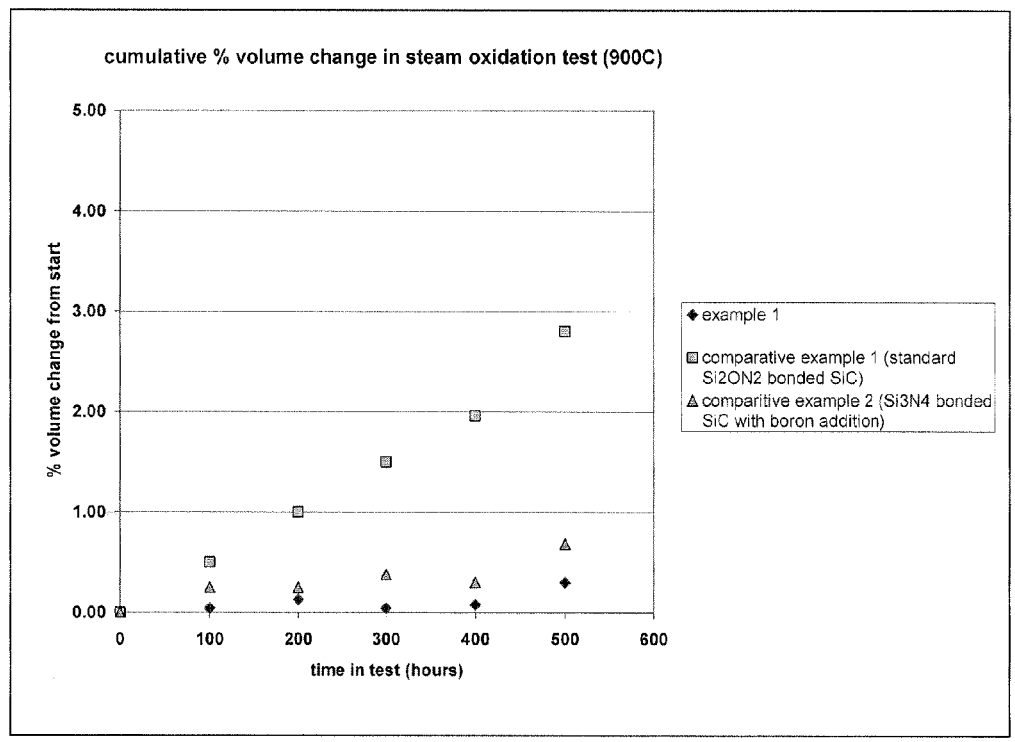
FIG. 1 shows a plot of percent volume change of samples fired in a nitrogen atmosphere.

This subject matter of the invention relates to the field of refractory linings, and is direct to a silicon oxynitride bonded silicon carbide or silicon oxynitride and silicon nitride bonded silicon carbide that has improved resistance to volume increase under oxidative stress, and methods for making the same.

Unless otherwise indicated, all of the percentages in the present description are percentages by weight. When a material is said to be "based on" a constituent, it is meant that said material includes more than about 50% by weight of that constituent.

Known methods of fabricating refractory tiles may be employed to fabricate a tile in accordance with the invention, provided that at least one boron compound is added to the starting charge.

The method generally includes preparing a starting charge includes a particulate mixture containing silicon carbide, forming the charge into a preform, and firing the preform in an atmosphere to form the silicon oxynitride bonded silicon carbide-based product. It has been determined that adding certain quantities of a boron or boron and calcium to the starting charge increases the resistance to volume change of the finished refractory material when such material is placed under oxidative stress. An example of oxidative stress is exposure to a steam atmosphere or burning garbage. In one embodiment, the resistance to volume change under oxidative stress is a 25% improvement over a similar product without the boron addition.

The starting charge comprises a mixture that preferably includes, as a percentage by weight, between about 30% and about 90% refractory grains, such as silicon carbide grains, wherein at least about 90% of the refractory grains have a size in the range about 50 μm (micrometer) to about 5 mm (millimeter), and about 10% to about 60% of at least one refractory powder, such as a silicon metal, wherein at least about 90% of the particles have a diameter of less than about 200 μm. Preferably, said granulometric distribution endows the fabricated tile with enhanced cohesion.

The starting charge includes a boron component comprising at least one boron compound. The boron compound can be supplied in a particulate form or in any other form, provided that the maximum moisture content of the mixture remains below about 7%, and preferably below about 5%. Examples of suitable boron-containing compounds include oxides, carbides, nitrides, fluorides, and metal alloys containing boron.

In one embodiment, the starting charge also includes a calcium component comprising at least one calcium compound. Examples of suitable calcium containing compounds include oxides, carbides, nitrides, fluorides, and metal alloys containing calcium.

A binder, such as methylcellulose in water, is also added to the starting charge. The function of the binder is to form with the starting charge a mass that is sufficiently rigid to preserve its shape until the preform is dried. The choice of binder depends on the desired shape. Because of the binder, the mass may advantageously take the form of a layer of varying thickness, which can follow the wall of the mold, to form tiles. Any known binder or mixture of known binders may be used. The binders are preferably "temporary," i.e., they are completely or partially eliminated during drying and firing steps. More preferably, at least one of the temporary binders is a solution of modified starch derivatives, an aqueous solution of dextrin or of lignone derivatives, a solution of a processing agent such as polyvinyl alcohol, a phenol resin or another epoxy type of resin, a furfuryl alcohol, or a mixture thereof. More preferably, the quantity of temporary binder is in the range between about 0.5% and about 7% by weight relative to the particulate mixture of the charge.

Pressing additives, as are conventionally used in fabricating sintered tiles, can be added to the particulate mixture and the binder. Examples of suitable pressing additives include plasticizers, such as modified starches, or polyethylene glycols and lubricants, such as soluble oils or stearate derivatives. The quantities of such additives are those conventionally used when fabricating sintered silicon carbide-based refractory tiles with a silicon nitride binder.

In embodiments where the material is filed in a nitrogen environment, silica, such as silica fume is employed as an oxygen source. In one embodiment, the silica fume has a surface area of 25 $m^2/g$. In embodiments where the firing atmosphere includes oxygen, silica is not necessary in the starting charge. The limestone is preferably in a ground powered form that is smaller than 200 mesh in size.

The components of the charge are combined by any suitable method known in the art. Examples of methods of mixing the components of the charge include using Hobart and Muller type mixers. Mixing of the starting charge includes the above described components and is continued until a substantially homogeneous mass is obtained. The mixed charge is then placed in a mold. The contents of the mold are compressed by applying a force to the upper surface of the charge, which can transform it into a preform that is capable of being reaction sintered. A specific pressure of about 300 $kg/cm^2$ (kilogram/square centimeter) to about 600 $kg/cm^2$ is appropriate. Pressing preferably is carried out uniaxially or isostatically, for example, by employing a hydraulic press. In one embodiment, pressing with a hydraulic press can be preceded by a manual or pneumatic and/or vibrational ramming operation.

The preform is then unmolded and dried. Drying can be carried out at a suitable temperature, such as at a temperature in a range of between about 80° C. and 200° C. Drying typically is conducted for a period of time in a range of between about 10 hours and about one week, depending on the format of the preform. In one embodiment, drying is conducted until the residual moisture content of the preform is less than about 0.5%.

The dried preform is then fired. The firing period, which typically lasts between about 3 and about 15 days (cold-to-cold), generally will depend on the materials of the preform and also on its size and shape. In accordance with the invention, firing is carried out in a nitrogen atmosphere or a mixed atmosphere of nitrogen and oxygen in order to form the oxynitride by reaction sintering (also referred to as reaction bonding), whereby the oxynitride acts as the ceramic binder for the grains. A nitrogen atmosphere is employed in one embodiment, including at least about 99.0% nitrogen. In another embodiment, the atmosphere is a mixed atmosphere, having between about 92% and about 99% nitrogen and between about 1% and about 8% oxygen. In one embodiment, the firing cycle is carried out at a temperature in a range of between about 1100° C. and about 1700° C., with a minimum peak temperature of about 1420° C. During firing, nitrogen and oxygen react with certain of the constituents of the particulate mixture of the charge to form a reaction sintered matrix of silicon oxynitride which can bind the grains of the charge, in particular, the grains of silicon carbide. A refractory tile of the invention is thus produced.

The finished product includes a silicon carbide component, a bond component including silicon oxynitride in excess of any silicon nitride of the bond component, and a residual boron component. In one embodiment, the amount of silicon oxynitride is at least about 5% by weight. In another embodiment, the amount of silicon nitride is less than about 10% by weight. In another embodiment, the finished product includes about 0.05% to about 3.0% by weight of the boron component.

The residual boron component in the finished product is a remainder from an initial amount that was present prior to reaction sintering (i.e., an initial amount of boron component added during formation of the starting charge). The initial amount added to the starting charge is an amount that has been determined to cause increased resistance of the finished refractory product to volume change under oxidative stress. An example of a suitable initial amount of boron component is described below, which is not intended to be limiting in any way.

Example 1

$Si_2ON_2$ Bonded SiC with Boron Addition

A production quantity of mix was made with the following proportion of dry powder ingredients: 84.2% black silicon carbide; 0.5% boron carbide; 9.0% silicon metal; 6.0% silica fume; 0.2% limestone. An organic binder solution of methylcellulose in water was added to the powders while mixing in a high intensity mixer. Sufficient organic binder solution was added to cause the mixture to be moldable.

Test tiles were made by pressing 8 lbs of mix for each tile in an impact press. The as-molded density for each tile was 2.65 g/cc. The molded tiles were dried at 93° C. to remove water before firing.

The tiles were fired in a kiln with peak temperature of 1430° C. under a nitrogen atmosphere. The temperature is increased at a rate determined to ensure temperature uniformity across the tile. The methylcellulose binder burned off during the first 15 hours inside the kiln, at which point the temperature was about 600° C. During firing, the silicon reacted with atmospheric nitrogen and oxygen in the mix to form a bond phase. Density of the fired parts was 2.70 g/cc.

Chemistry of two fired tiles of the above described process was evaluated by the LECO method (elemental analysis using a LECO instrument) and by X-ray diffraction. By LECO, tile 1 contained 6.48% nitrogen and 2.56% oxygen; and tile 2 contained 6.22% nitrogen and 2.90% oxygen. By X-ray diffraction, tile 1 contained 1.1% β $Si_3N_4$, 18.2% $Si_2ON_2$, and 80.7% SiC; and tile 2 contained 19.2% $Si_2ON_2$ and 80.7% SiC.

Steam oxidation resistance was evaluated for a test piece from tile 1. The test piece was one quarter of the original tile. The steam oxidation test (ASTM C-863) was done at 900° C. in a sealed muffle, with steam flowing at the rate of 2 lb/ft³ of chamber volume per hour. The test was run for a total of 500 hours in 100 hour increments. The density, weight, and volume of the test piece was measured before the test began and following each 100 hour test increment. At the end of 500 hours in the test, the volume gain for the test piece made according to Example 1 was 0.3% and the weight gain was 2.07%.

Comparative Example 1

Standard $Si_2ON_2$ Bonded SiC, No Boron

A production quantity of mix was made with the following proportion of dry powder ingredients: 84.7% black silicon carbide; 9.1% silicon metal; 6.0% silica fume; 0.2% limestone. An organic binder solution of methylcellulose in water was added to the powders while mixing in a high intensity mixer. Sufficient organic binder solution was added cause the mixture to be moldable.

Test tiles were made by pressing 8 lbs of mix for each tile in an impact press. The as-molded density for each tile was 2.65 g/cc. The molded tiles were dried at 93° C. to remove water before firing.

The tiles were fired in a kiln with peak temperature of 1430° C. under a nitrogen atmosphere. The methylcellulose binder burned off during the first 15 hours inside the kiln, at which point the temperature was about 600° C. During firing, the silicon reacted with atmospheric nitrogen and oxygen in the mix to form a bond phase. Density of fired parts was 2.70 g/cc.

Chemistry of two fired tiles of the above described process was evaluated by the LECO method and by X-ray diffraction. By LECO, tile 3 contained 5.46% nitrogen and 3.62% oxygen; and tile 4 contained 5.19% nitrogen and 3.46% oxygen. By X-ray diffraction, tile 3 contained 19.7% $Si_2ON_2$, and 80.3% SiC; and tile 4 contained 17.6% $Si_2ON_2$ and 82.4% SiC.

Steam oxidation resistance was evaluated for a test piece from tile 3. The test piece was one quarter of the original tile. The steam oxidation test (ASTM C-863) was done at 900° C. in a sealed muffle, with steam flowing at the rate of 2 lb/ft³ of chamber volume per hour. The test was run for a total of 500 hours in 100 hour increments. The density, weight, and volume of the test piece was measured before the test began and following each 100 hour test increment. At the end of 500 hours in the test, the volume gain for the test piece made according to Comparative Example 1 was 2.80% and the weight gain was 1.29%.

Comparative Example 2

$Si_3N_4$ Bonded SiC with Boron Addition

A production quantity of mix was made with the following proportion of dry powder ingredients: 82.3% black silicon carbide; 0.5% boron carbide; 14.0% silicon metal; 3.2% organic binders. Water was added to the powders while mixing in a high intensity mixer. Sufficient water was added to cause the mixture to be moldable.

Test tiles were made by pressing 8 lbs of mix for each tile in an impact press. The as-molded density for each tile was 2.54 g/cc. The molded tiles were dried at 110° C. to remove water before firing.

The tiles were fired in a kiln with peak temperature of 1430° C. under a nitrogen atmosphere. The organic binders burned off during the first 15 hours inside the kiln, at which point the temperature was about 600° C. During firing, the silicon reacted with atmospheric nitrogen to form a bond phase. Density of fired parts was 2.70 g/cc.

Chemistry of two fired tiles of the above described process was evaluated by the LECO method and by X-ray diffraction. By LECO, tile 5 contained 8.70% nitrogen and 0.31% oxygen; and tile 6 contained 7.98% nitrogen and 0.35% oxygen. By X-ray diffraction, tile 5 contained 7.4% α $Si_3N_4$, 12.5% β $Si_3N_4$, and 80.1% SiC; and tile 6 contained 7.3% α $Si_3N_4$, 10.1% β $Si_3N_4$, 2.5% $Si_2ON_2$ and 80.1% SiC.

Steam oxidation resistance was evaluated for a test piece from tile 5. The test piece was one quarter of the original tile. The steam oxidation test (ASTM C-863) was done at 900° C. in a sealed muffle, with steam flowing at the rate of 2 lb/ft³ of chamber volume per hour. The test was run for a total of 500 hours in 100 hour increments. The density, weight, and volume of the test piece was measured before the test began and following each 100 hour test increment. At the end of 500 hours in the test, the volume gain for the test piece made according to Comparative Example 2 was 0.68% and the weight gain was 2.23%.

TABLE 1

|  | Tile # | % N | % O | % α Si$_3$N$_4$ (XRD) | % β Si$_3$N$_4$ (XRD) | % Si$_2$ON$_2$ (XRD) | % SiC (XRD) | density (g/cc) | % vol gain in steam ox test | % wt gain in steam ox test |
|---|---|---|---|---|---|---|---|---|---|---|
| Example 1 | 1 | 6.48 | 2.56 | 0.0 | 1.1 | 18.2 | 80.7 | 2.74 | 0.30 | 2.07 |
|  | 2 | 6.22 | 2.90 | 0.0 | 0.0 | 19.2 | 80.7 | 2.68 |  |  |
| Comparative Example 1 | 3 | 5.46 | 3.62 | 0.0 | 0.0 | 19.7 | 80.3 | 2.70 | 2.80 | 1.29 |
|  | 4 | 5.19 | 3.46 | 0.0 | 0.0 | 17.6 | 82.4 | — |  |  |
| Comparative Example 2 | 5 | 8.70 | 0.31 | 7.4 | 12.5 | 0.0 | 80.1 | 2.69 | 0.68 | 2.23 |
|  | 6 | 7.98 | 0.35 | 7.3 | 10.1 | 2.5 | 80.1 | 2.71 |  |  |

Table 1 above indicates that silicon oxynitride bonded silicon carbide material formed from a starting charge containing a boron compound (Example 1) had better resistance to volume increase under oxidative stress when compared to silicon oxynitride bonded silicon carbide formed from a starting charge that did not contain a boron compound (Comparative Example 1). Additionally, the silicon oxynitride bonded silicon carbide material formed from a starting charge containing a boron compound also exhibited better resistance to volume increase under oxidative stress in comparison to silicon nitride bonded silicon carbide formed from a charge similarly containing a boron compound (Comparative Example 2).

Example 2

Si$_2$ON$_2$ Bonded SiC with Boron Addition in Various Amounts

The effect of boron in various amounts was tested by forming three types of silicon oxynitride bonded silicon carbide samples: a standard sample containing no boron, a sample containing 0.5% boron carbide, and a sample containing 1.0% boron carbide. The samples were batched from the same lots of materials and included the formulations indicated in Table 2.

TABLE 2

|  | Mixes | | |
|---|---|---|---|
| Materials | Standard | 0.5% B4C | 1.0% B4C |
| Black Silicon Carbide | 87.0 | 86.5 | 86.0 |
| Limestone | 0.956 | 0.956 | 0.956 |
| Silicon Metal | 7.652 | 7.652 | 7.652 |
| Boron Carbide | 0 | 0.5 | 1 |
| Binder plus Water | 4.352 | 4.352 | 4.352 |

Figure 2:
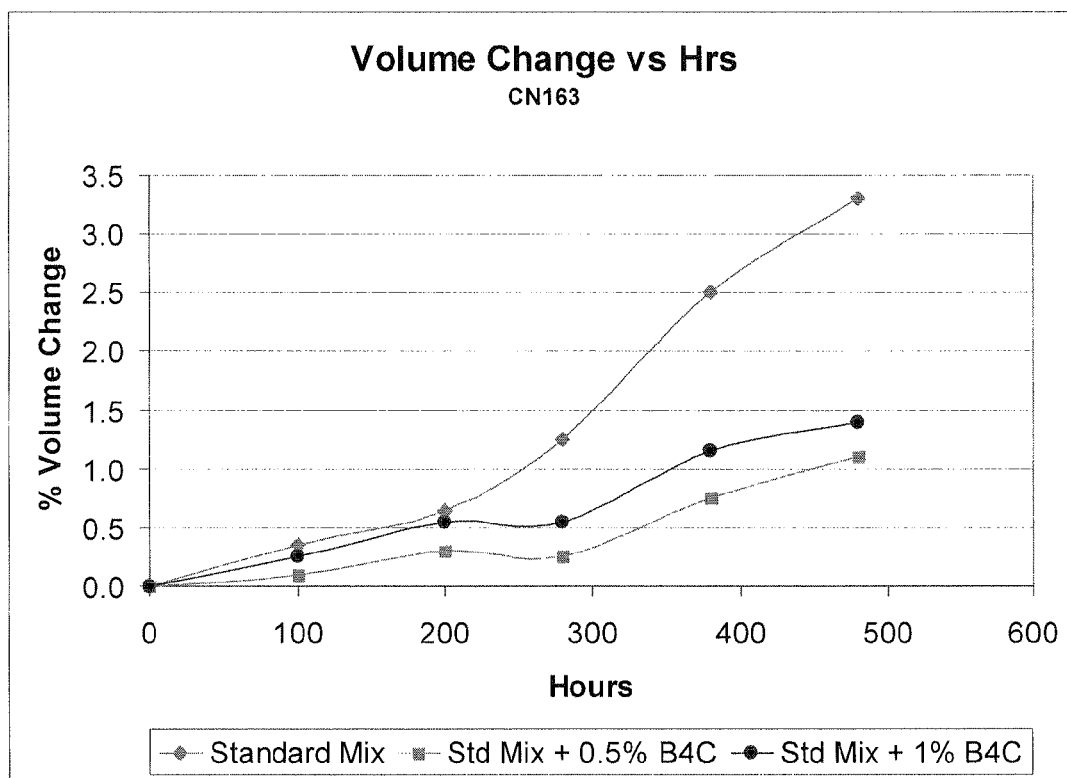
FIG. 2 shows a plot of percent volume change of samples fired in a nitrogen and oxygen mixed atmosphere.

Mixing was performed in a Hobart type mixer and hydraulically pressed on a uniaxial press to the same target density. The samples were fired under a mixed atmosphere of 7.5% oxygen and 92.5% nitrogen to produce silicon oxynitride bonded silicon carbide. The fired samples were tested under the ASTM C-863 steam oxidation test at 1000° C. The results of the steam oxidation test can be seen in FIG. 2, which indicates that the inclusion of boron in the starting charge improves resistance to volume change under oxidative stress.

While this invention has been particularly shown and described with references to example embodiments thereof, it will be understood by those skilled in the art that various changes in form and details may be made therein without departing from the scope of the invention, including various obvious modifications and equivalent arrangements encompassed by the appended claims.

What is claimed is:

1. A reaction sintered silicon carbide-based product comprising:
   a. a silicon carbide component that is more than about 50% by weight of the silicon carbide-based product;
   b. a bond component, wherein the bond component includes silicon oxynitride (Si$_2$ON$_2$) in excess of any silicon nitride of the bond component; and
   c. at least one boron component residual to an amount present prior to reaction sintering to cause increased resistance of the reaction sintered silicon carbide-based product to volume change under oxidative stress.

2. The reaction sintered silicon carbide-based product of claim 1, wherein the boron component is a boron compound selected from the group of oxides, carbides, nitrides, fluorides, and metal alloys containing boron.

3. The reaction sintered silicon carbide-based product of claim 1, including about 0.05% to about 3.0% by weight of the boron component.

4. The reaction sintered silicon carbide-based product of claim 1, wherein the amount of silicon oxynitride is at least about 5% by weight.

5. The reaction sintered silicon carbide-based product of claim 1, wherein the amount of silicon nitride is less than about 10% by weight.

6. The reaction sintered silicon carbide-based product of claim 1, further comprising at least one calcium compound.

7. A silicon oxynitride bonded silicon carbide-based product, formed by a method comprising the steps of:
   a. preparing a charge comprising a mixture containing silicon carbide, silicon metal, silica, a binder, and at least one boron compound in an amount to cause increased resistance of the silicon oxynitride bonded silicon carbide-based product to volume change under oxidative stress, whereby, after firing, the resulting product will be greater than about 50% by weight silicon carbide;
   b. forming the charge into a preform; and
   c. firing the preform in a substantially nitrogen atmosphere to form the silicon oxynitride bonded silicon carbide-based product that is more than about 50% by weight silicon carbide, bonded by a bond component that includes silicon oxynitride (Si$_2$ON$_2$) in excess of any silicon nitride of the bond component.

8. The silicon oxynitride bonded silicon carbide-based product of claim 7, wherein the mixture further comprises at least one calcium compound.

9. A silicon oxynitride bonded silicon carbide-based product, formed by a method comprising the steps of:
   a. preparing a charge comprising a mixture containing silicon carbide, silicon metal, a binder, and at least one boron compound in an amount to cause increased resistance of the silicon oxynitride bonded silicon carbide-based product to volume change under oxidative stress, whereby, after firing, the resulting product will be greater than about 50% by weight silicon carbide;
b. forming the charge into a preform; and
c. firing the preform in a mixed atmosphere of oxygen and nitrogen to form the silicon oxynitride bonded silicon carbide-based product that is more than about 50% by weight silicon carbide, bonded by a bond component that includes silicon oxynitride ($Si_2ON_2$) in excess of any silicon nitride of the bond component.

10. The silicon oxynitride bonded silicon carbide-based product of claim 9, wherein the mixture further comprises at least one calcium compound.

* * * * *

UNITED STATES PATENT AND TRADEMARK OFFICE
CERTIFICATE OF CORRECTION

PATENT NO. : 8,003,557 B2  Page 1 of 1
APPLICATION NO. : 12/483788
DATED : August 23, 2011
INVENTOR(S) : Nancy F. Levoy It is certified that error appears in the above-identified patent and that said Letters Patent is hereby corrected as shown below:

On the Title Page, Item (75), delete "Nancy P. Levoy" and insert --Nancy F. Levoy--

Signed and Sealed this
Third Day of June, 2014

Michelle K. Lee
*Deputy Director of the United States Patent and Trademark Office*